United States Patent [19]

Iwashima et al.

[11] Patent Number: 6,072,927
[45] Date of Patent: Jun. 6, 2000

[54] OPTICAL FILTER

[75] Inventors: Toru Iwashima; Michiko Harumoto, both of Yokohama, Japan

[73] Assignee: Sumitomo Electric Industries, Ltd., Osaka, Japan

[21] Appl. No.: 09/129,623

[22] Filed: Aug. 5, 1998

[30] Foreign Application Priority Data

Aug. 5, 1997 [JP] Japan ................................ 9-210582

[51] Int. Cl.[7] .................................................. G02B 6/34
[52] U.S. Cl. ........................................ 385/37; 385/27
[58] Field of Search ................................ 385/37, 27

[56] References Cited

FOREIGN PATENT DOCUMENTS

97/22023   6/1997   WIPO .

OTHER PUBLICATIONS

M.N. Zervas et al.: "Design of Apodised Linearly–Chirped Fibre Gratings for Optical Communications" 22nd European Conference on Optical Communication, vol. 3, Sep. 15–19 1996, pp. 233–236, XP002084740 OSLO, Norway.

Williams J A R et al: "Fiber Bragg Grating Fabrication for Dispersion Slope Compensation" IEEE Photonics Technology Letters, vol. 8, No. 9, Sep. 1996, pp. 1187–1189, XP000624871.

Atkinson D et al: "Numerical Study of 10–CM Chirped Grating Pairs for Dispersion Compensation at 10 GB/S Over 600 KM of Nondispersion Shifted Fiber" IEEE Photonics Technology Letters, vol. 8, No. 8, Aug. 1, 1996, pp. 1085–1087, XP000621662.

T.A. Strasser, et al. (UV–Induced Fiber Grating OADM Devices for Efficient Bandwidth Utilization, OFC '96, PD8) 1996 [No Month].

*Primary Examiner*—John D. Lee
*Assistant Examiner*—Juliana K. Kang
*Attorney, Agent, or Firm*—Pillsbury Madison & Sutro LLP

[57] ABSTRACT

In an optical filter formed with a grating whose refractive index fluctuates along an optical axis of an optical waveguide so as to reflect light in a predetermined wavelength band, assuming that a position in the grating area is defined by a positional coordinate value z which is standardized by $-\pi$ to $\pi$ in a light propagating direction, an amplitude $\Delta n$ of refractive index changing width in z satisfies:

$$k_1\left[1-\left(\frac{1-\cos z}{2}\right)^{x_1}\right] \leq \Delta n \leq k_2\left[1-\left(\frac{1-\cos z}{2}\right)^{x_2}\right]$$

$$k_1 \leq k_2$$

$$1 < x_1 \leq x_2$$

by use of predetermined parameters $x_1$ and $x_2$ and proportional constants $k_1$ and $k_2$, $\Delta n$ monotonously increasing or decreasing depending on whether the expression $-\pi \leq z \leq 0$ or $0 \leq z \leq \pi$ is satisfied, respectively.

2 Claims, 9 Drawing Sheets

REFRACTIVE INDEX

OPTICAL FILTER

BACKGROUND OF THE INVENTION

1. Field of the Invention

The present invention relates to an optical filter formed with a grating having a refractive index change with a predetermined periodicity along an optical axis of an optical waveguide.

2. Related Background Art

Conventionally known is an optical filter formed with a grating having a refractive index change with a predetermined periodicity along an optical axis of an optical waveguide (optical fiber, flat optical waveguide, or the like). Light transmission and reflection characteristics of this optical filter depend on wavelength $\lambda$ of light, period $\Lambda$ of refractive index change, effective refractive index $n_{eff}$, and length L of the area where the grating is formed in its optical axis direction.

In transmission and reflection characteristics of an optical filter formed with a grating having a refractive index changing width with a uniform amplitude, as a general tendency, reflectivity R increases or decreases (transmittance T decreases or increases) respectively depending on whether wavelength is closer to or farther away from Bragg wavelength $\lambda_B$ which satisfies:

$$2n_{eff} \cdot \Lambda = m \cdot \lambda_B \quad (1)$$

where m is a positive integral.

For example, as shown in FIG. 7, in the case of an optical filter in an optical fiber comprising a core 1 and a cladding 3, in which an area of the core 1 is formed with a grating 2 whose refractive index changes along the optical axis with a predetermined pitch $\Lambda$ and a uniform amplitude, when light having a wavelength $\lambda$ propagated through this optical fiber reaches the optical filter, it is partially transmitted therethrough and the remainder is reflected thereby, depending on the value of wavelength $\lambda$. Namely, transmission decreases or increases depending on whether the wavelength is closer to or farther away from Bragg wavelength $\lambda_B$. FIG. 8 is a graph showing transmission and reflection characteristics of such an optical filter. Here, Bragg wavelength $\lambda_B$ is assumed to be at 1,552.5 nm.

As shown in FIG. 8, reflectivity R is about 1 (i.e., about 0 dB) within a reflection wavelength bandwidth of about 0.3 nm centered at Bragg wavelength $\lambda_B$, whereas it repeatedly ripples (increases and decreases in the form of mountainous waves) with descending peak levels as the difference between the wavelength $\lambda$ of the light and Bragg wavelength $\lambda_B$ increases. On the other hand, since this optical filter itself does not absorb light, transmittance T is represented by the following expression:

$$T = 1 - R \quad (2)$$

Thus, this optical filter can be used as a band-pass filter which reflects light having a wavelength within a predetermined reflection wavelength band, while transmitting therethrough light outsider the reflection wavelength band.

In the transmission and reflection characteristics of such an optical filter formed with a grating having a uniform amplitude of refractive index changing width, though reflectivity R and transmittance T rise up and fall down acutely near cutoff wavelengths, ripples of reflectivity R having high peak levels also exist in close proximity to the reflection wavelength band. Even when the difference between the wavelength $\lambda$ and the reflect ion wavelength band increases, the peak level of reflectivity R in each ripple is still high.

An optical filter known as having more excellent transmission and reflection characteristics is the one constituted by a grating whose amplitude of refractive index changing width is defined by a Gaussian function with respect to a positional variable in the optical axis direction (e.g., T. A. Strasser et. al., "UV-induced Fiber Grating OADM Devices for Efficient Bandwidth Utilization," OFC'96, PD8). FIG. 9 is a graph showing an example of transmission and reflection characteristics of thus formed optical filter.

In the case where the amplitude of refractive index changing width is thus defined by a Gaussian function (hereinafter referred to as Gaussian type), as shown in FIG. 9, reflectivity R is about 1 within a reflection wavelength bandwidth of about 0.4 nm centered at Bragg wavelength $\lambda_B$, whereas it decreases outside the reflection wavelength band. When compared with FIG. 8, it can be seen that, though reflectivity R and transmittance T rise up and fall down near cutoff wavelengths more gradually than in the case with a uniform amplitude of refractive index change (FIG. 8), the peak level of each ripple of reflectivity R outside the reflection wavelength band is lower in the case of Gaussian type (FIG. 9).

Such alteration of transmission and reflection characteristics of an optical filter by making the refractive index change in its grating conform to a certain form of function so as not to become uniform is known as apodization, and thus formed fiber grating is known as apodized fiber grating.

In an optical filter in which the amplitude of refractive index change in the grating is of a Gaussian type as with the above-mentioned conventional example, however, the acuteness in rising and falling of reflectivity R and transmittance T near cutoff wavelengths may not be sufficient.

SUMMARY OF THE INVENTION

For example, an optical filter has been used for dividing signal light multiplexed in wavelength division multiplex (WDM) transmission, in which a plurality of wavelengths of signal light are multiplexed and then transmitted, or the like. In the WDM transmission, in order to effect transmission with a larger capacity, it is desired to form multiplexed signal light having a greater number of wavelengths within the same wavelength band. Since adjacent channels consequently become closer to each other in terms of their gaps, there is a demand for an optical filter in which the peak level in each ripple of reflectivity R observed outside the reflection wavelength band is small, while reflectivity R and transmittance T rise up and fall down acutely near cutoff wavelengths.

Therefore, it is an object of the present invention to provide, by overcoming the foregoing problems, an optical filter in which the peak level in each ripple of reflectivity R observed outside the reflection wavelength band can be suppressed to a low level, while reflectivity R and transmittance T rise up and fall down acutely near cutoff wavelengths.

The optical filter in accordance with the present invention is an optical filter formed with a grating whose refractive index fluctuates along an optical axis of an optical waveguide so as to reflect light in a predetermined wavelength band, wherein, assuming that a position in the grating area is defined by a positional coordinate value z which is standardized by $-\pi$ to $\pi$ in a light propagating direction, an amplitude $\Delta n$ of refractive index changing width in z satisfies:

$$k_1\left[1-\left(\frac{1-\cos z}{2}\right)^{x_1}\right] \le \Delta n \le k_2\left[1-\left(\frac{1-\cos z}{2}\right)^{x_2}\right] \quad (3)$$

$$k_1 \le k_2$$

$$1 < x_1 \le x_2$$

by use of predetermined parameters $x_1$ and $x_2$ and proportional constants $k_1$ and $k_2$, Δn monotonously increasing or decreasing depending on whether the expression $-\pi \le z \le 0$ or $0 \le z \le \pi$ is satisfied, respectively.

The optical filter thus formed functions as a band-pass filter that can reflect light within a reflection wavelength band including Bragg wavelength and transmit light outside the reflection wavelength band. It yields good transmission and reflection characteristics because reflectivity and transmittance near its cutoff wavelengths rise up and fall down sufficiently acutely and peak levels of ripples of reflectivity appearing outside the reflection wavelength band are sufficiently low.

Further, it is more preferable that their constants satisfy $k_1=k_2$ when parameter $x_2$ does not exceed 2.0. The inventors have confirmed that peak levels of ripples of reflectivity appearing outside the reflection wavelength band become particularly low in this case.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the present invention will be explained in detail with reference to the accompanying drawings. In the explanation of drawings, constituents identical to each other will be referred to with numerals or letters identical to each other without repeating their overlapping descriptions. The optical filter in accordance with the present invention is not limited to the one in which an optical fiber is formed with a grating, but is also applicable to a flat optical waveguide formed with a grating, for example. Though the former will be explained in the following, the latter can also be realized in a similar manner.

Figures 1A, 1B:
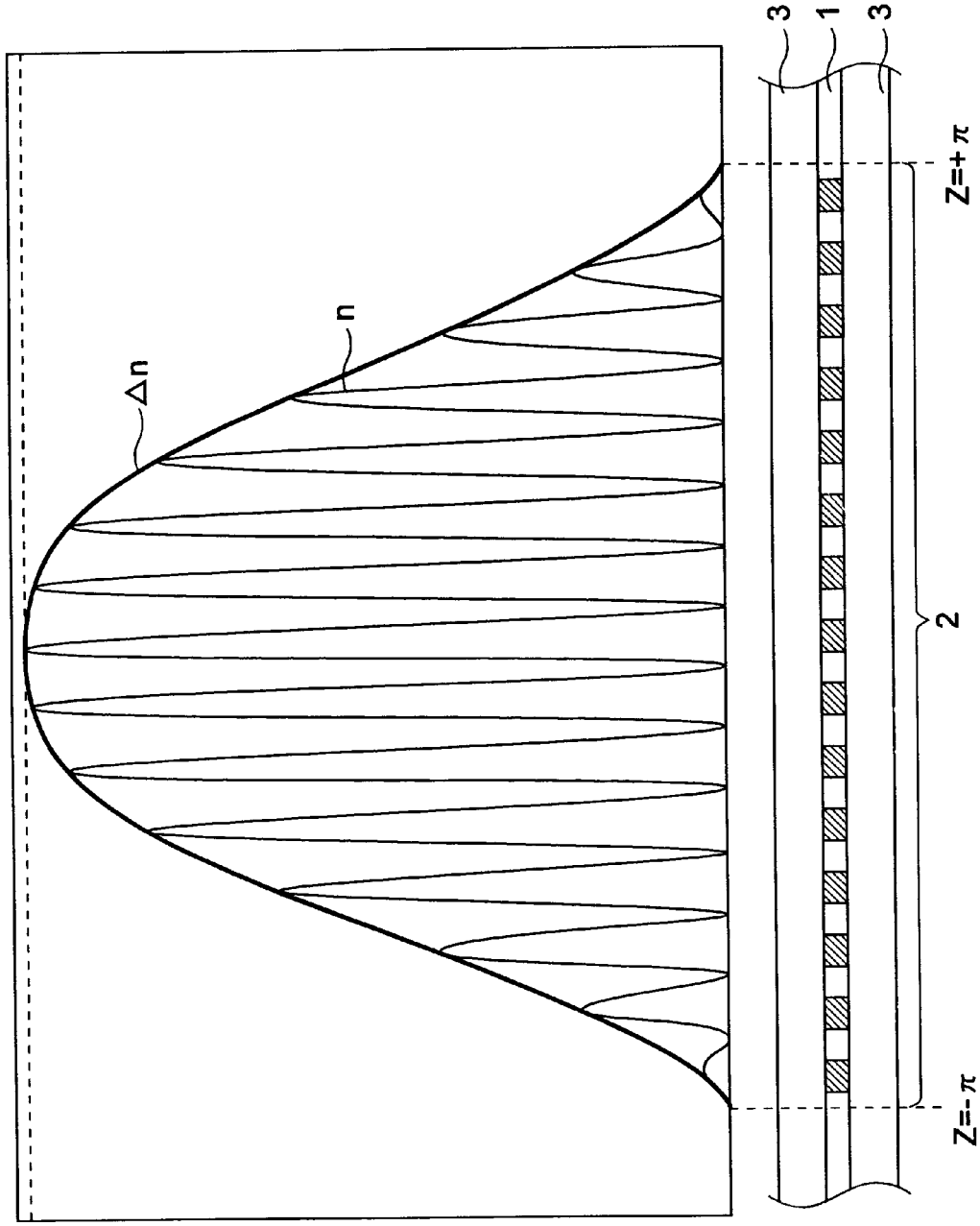
FIGS. 1A and 1B are explanatory views of an optical filter in accordance with the present invention.

To begin with, the configuration of an optical filter in accordance with a first embodiment of the present invention will be explained. FIGS. 1A and 1B are explanatory views of the optical filter in accordance with this embodiment. Specifically, FIG. 1A is an explanatory view of the optical filter in which an optical filter is formed with a grating 2, whereas FIG. 1B is a graph for explaining a distribution of refractive index n in its area corresponding to the grating 2. Though several thousand pitches (or more) of grating are typically formed, for convenience of explanation, the number of pitches of the grating depicted here is far less than that in practice.

As depicted, the optical filter in accordance with the present invention comprises the grating 2 formed in a certain area in the optical axis direction of an optical fiber having a cladding region 3 disposed around a core region 1 located at the center. The grating 2 is formed by changing the refractive index n in the core region 1 with a constant pitch along the optical axis direction. In FIG. 1A, the hatched portion in the core region 1 indicate an area where the value of refractive index n is greater than in the part without hatches in the core region 1.

FIG. 1B shows, as a thin line, a distribution of refractive index n in the core region 1 along the optical axis, while indicating, as a thick line, a distribution of amplitude Δn of refractive index changing width. Here, the amplitude Δn of refractive index changing width refers to a difference between the maximum and minimum values of refractive index n in each minute area including at least one pitch (corresponding to one cycle of refractive index change) in the area formed with the grating. In the optical filter in accordance with this embodiment, the amplitude Δn of refractive index changing width is expressed as a function of positional variable z as:

$$\Delta n = k \cdot \{1-[(1-\cos z)/2]^x\} \quad (4)$$

wherein x>0. Here, z is a positional coordinate value standardized by assuming that the area formed with the grating extends from $-\pi$ to $\pi$, x is a parameter determining the function type of the amplitude Δn of refractive index changing width, and k is a proportional constant. Also, cos is the cosine function, and π n is the ratio of the circumference of a circle to its diameter.

An optical fiber is formed with such a grating whose amplitude Δn of refractive index changing width changes in conformity to expression (4), for example, in the following manner. Namely, a silica type optical fiber whose core region is doped with Ge element is prepared and then, while a slit is scanned along the optical axis direction of this optical fiber at a predetermined speed, an interference fringe is projected onto its core region through the slit by two-beam interference method or phase mask method. Here, due to a photochemical reaction caused by the light incident on the core region, refractive index increases in the core region. This increase in refractive index corresponds to the product of the intensity of light at each position of the interference fringe and the time during which the interference fringe is projected. Therefore, in each standardized positional coordinate value z along the optical axis of the optical fiber, the scanning speed of the slit is appropriately changed according to the standardized positional coordinate value z so as to attain an exposure which induces refractive index changing of Δn represented by expression (4).

Figure 2:
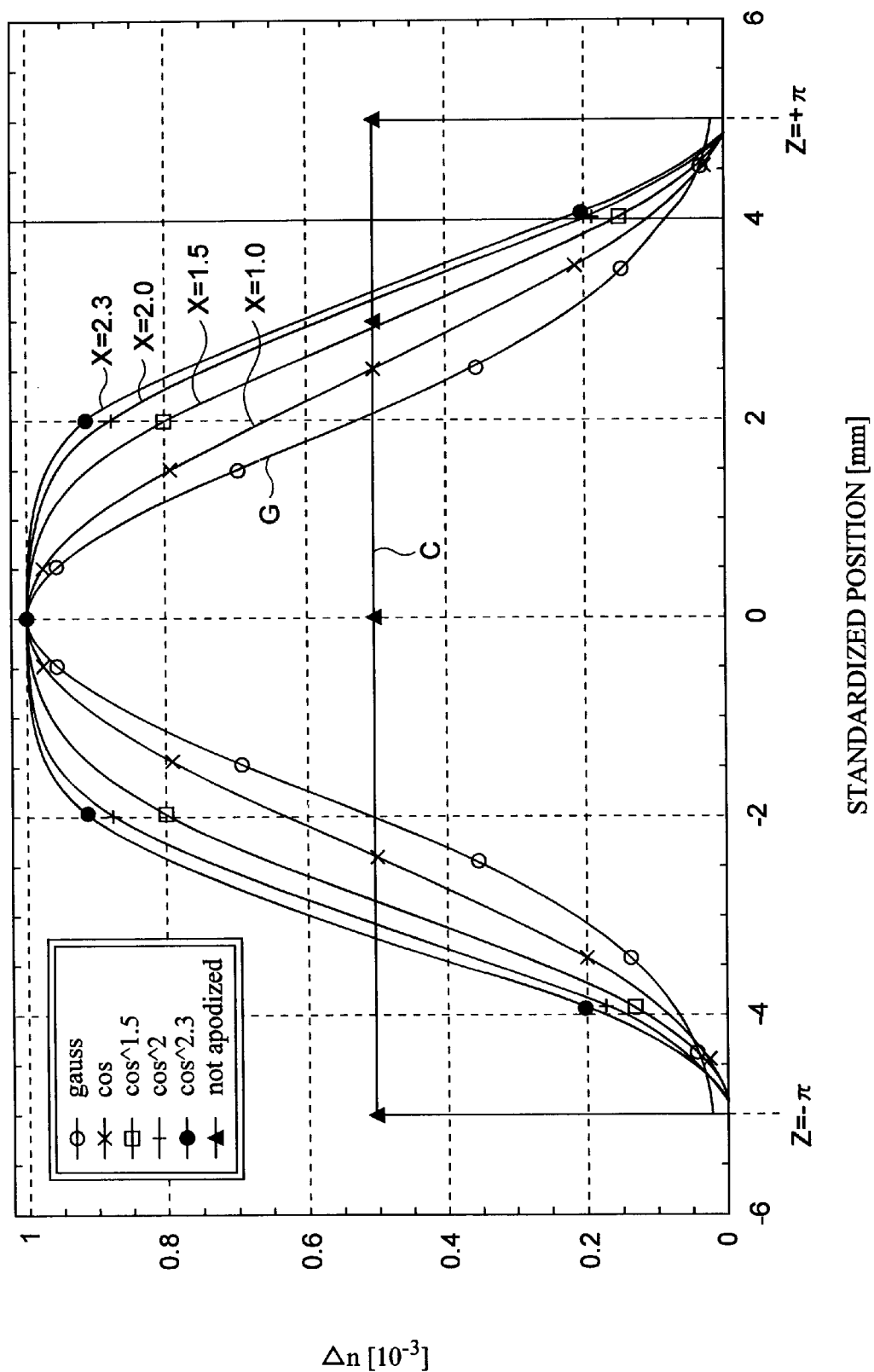
FIG. 2 is a graph showing various function types for amplitude Δn of refractive index changing width.
Figure 3:
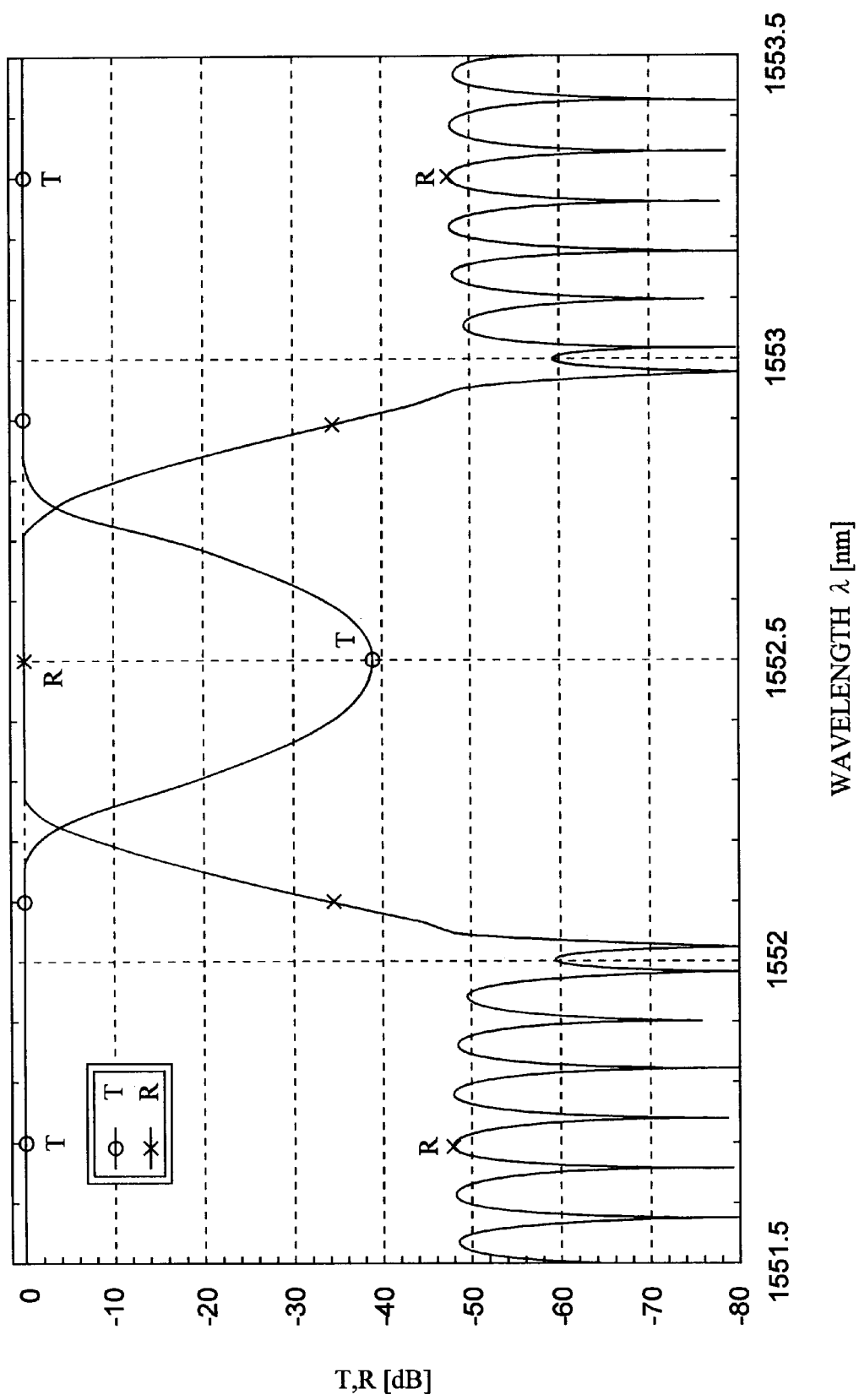
FIG. 3 is a graph showing transmission and reflection characteristics of an optical filter in which the value of parameter x is set to 1.0 in a first embodiment of the present invention.
Figure 4:
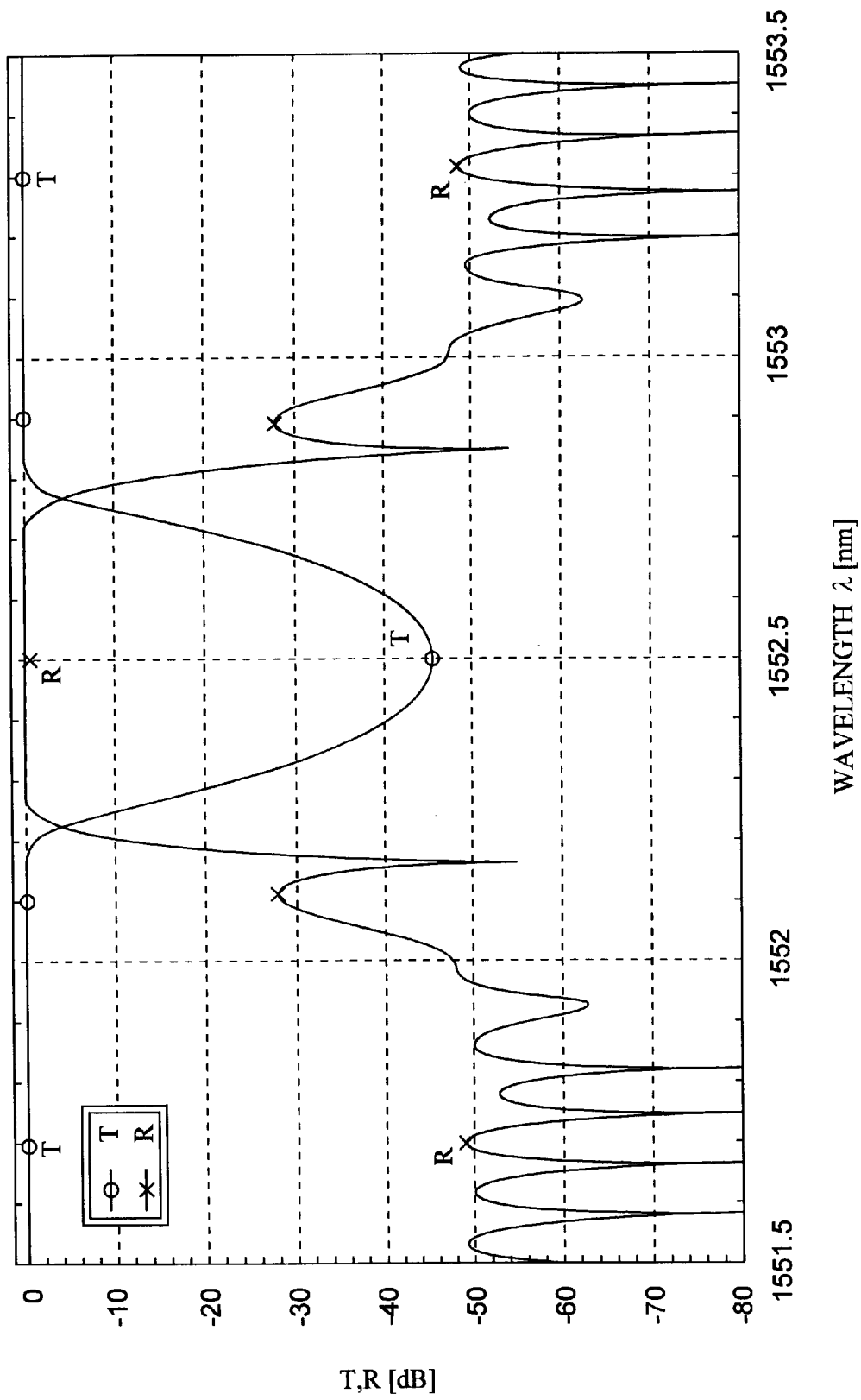
FIG. 4 is a graph showing transmission and reflection characteristics of an optical filter in which the value of parameter x is set to 1.5 in the first embodiment.
Figure 5:
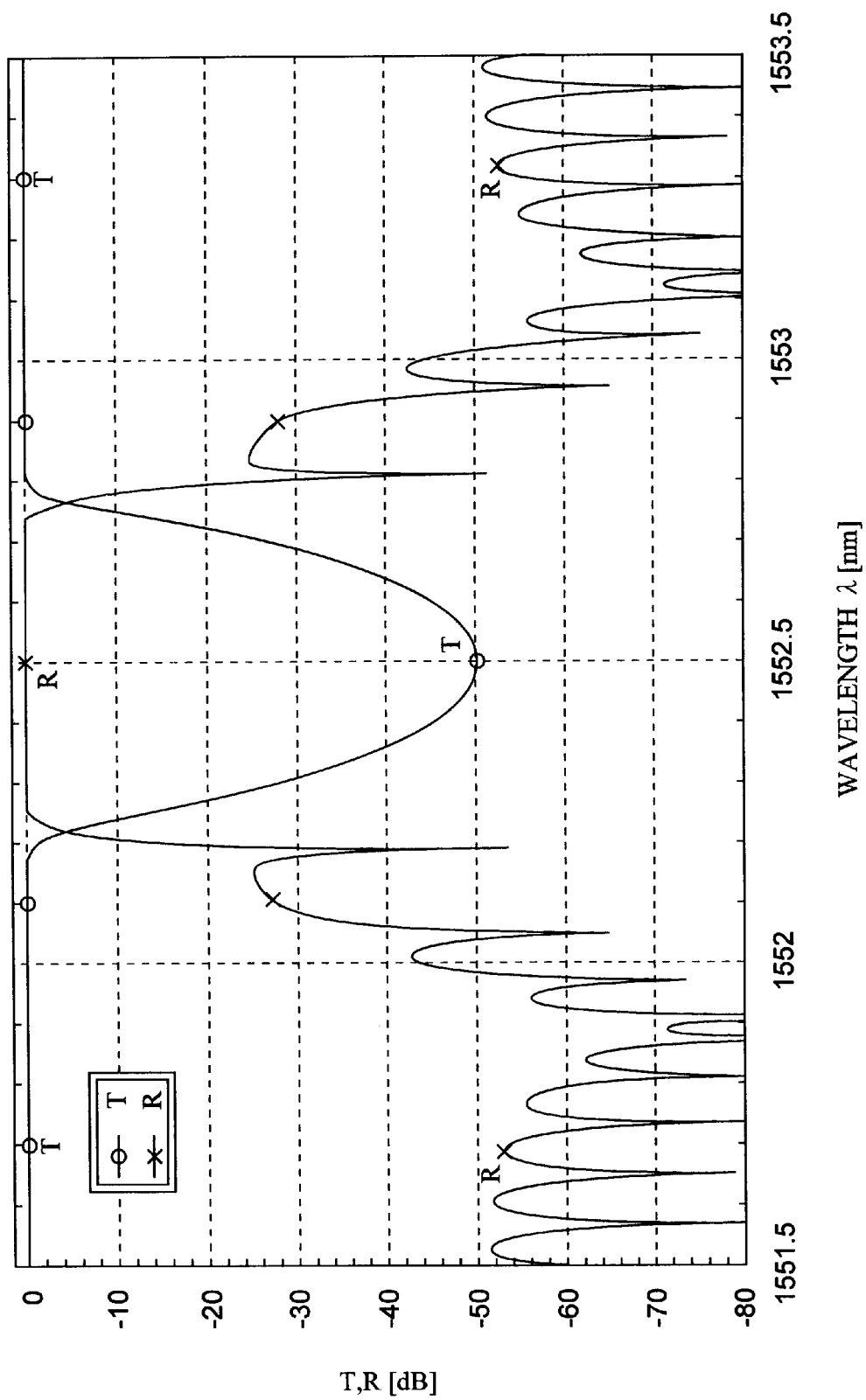
FIG. 5 is a graph showing transmission and reflection characteristics of an optical filter in which the value of parameter x is set to 2.0 in the first embodiment.
Figure 6:
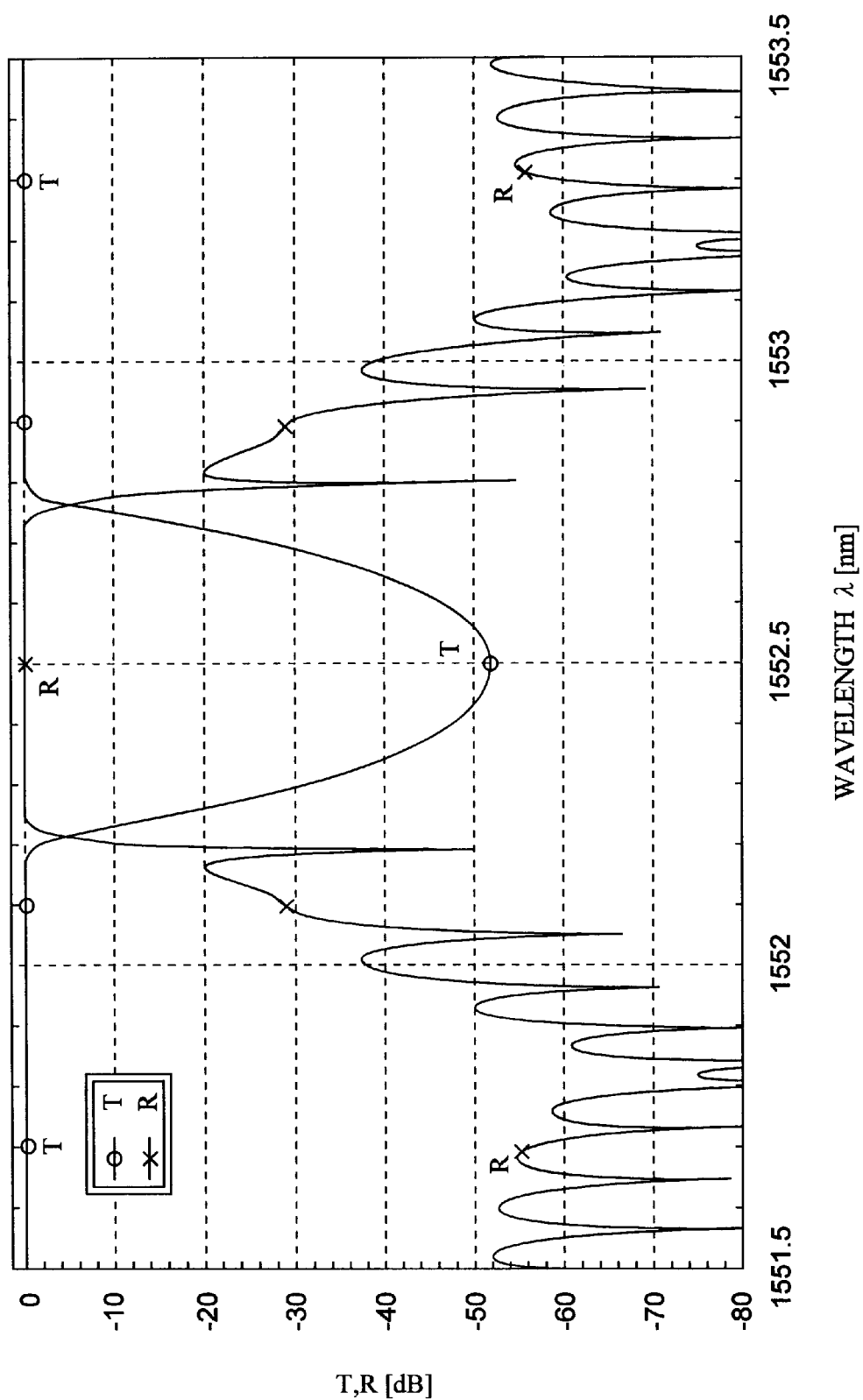
FIG. 6 is a graph showing transmission and reflection characteristics of an optical filter in which the value of parameter x is set to 2.3 in the first embodiment.
Figure 7:
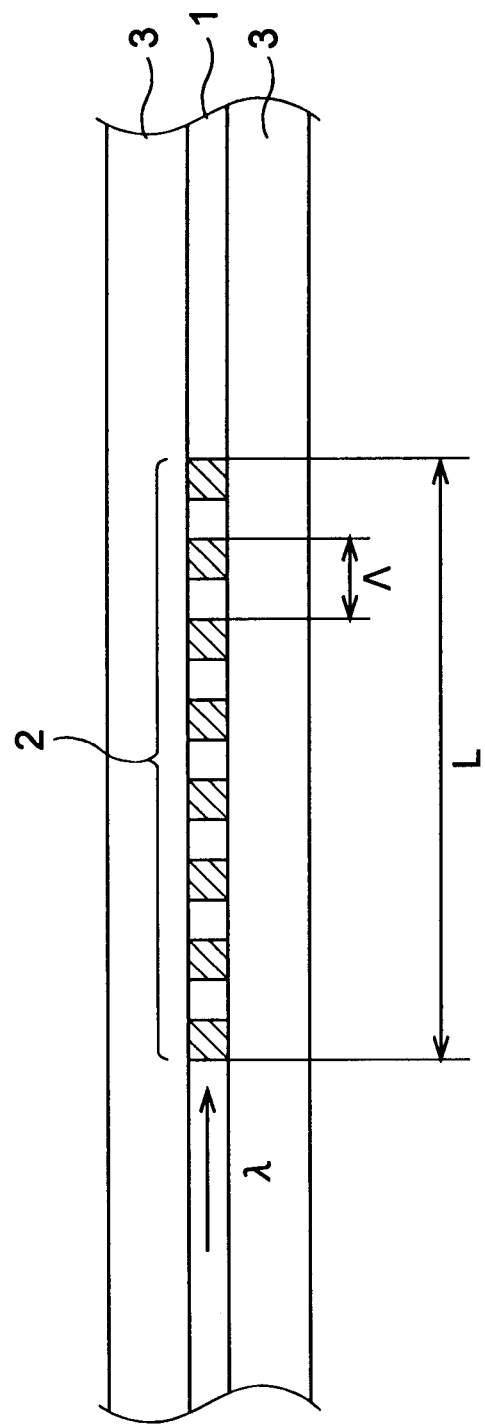
FIG. 7 is an explanatory view of an optical filter in which a grating is formed in an optical fiber.

FIG. 2 is a graph showing various kinds of function types employable as the amplitude Δn of refractive index changing width. This graph shows the cases where the value of parameter x in the above-mentioned expression (4) is changed among 1.0, 1.5, 2.0, and 2.3 (each with k of $1 \times 10^{-3}$), the case C where the amplitude Δn of refractive index changing width is uniform (indicated by triangles in the graph), and the case G where the amplitude Δn of refractive index changing width is of a Gaussian type (indicated by white circles in the graph). In this optical filter, an area having a length of 10 mm extending along the optical axis direction of the optical fiber is formed with a grating having a constant pitch Λ, while positional coordinate values z of both ends of the area formed with the grating are standardized as $-\pi$ and $\pi$, respectively.

In the following, transmission and reflection characteristics of the optical filter in the respective cases where the value of parameter x in the above-mentioned expression (4) is set to 1.0, 1.5, 2.0, and 2.3 will be individually explained. FIGS. 3 to 6 are graphs showing the transmission and reflection characteristics of the optical filter in the respective cases. Here, Bragg wavelength $\lambda_B$ is set to 1,552.5 nm.

Figure 8:
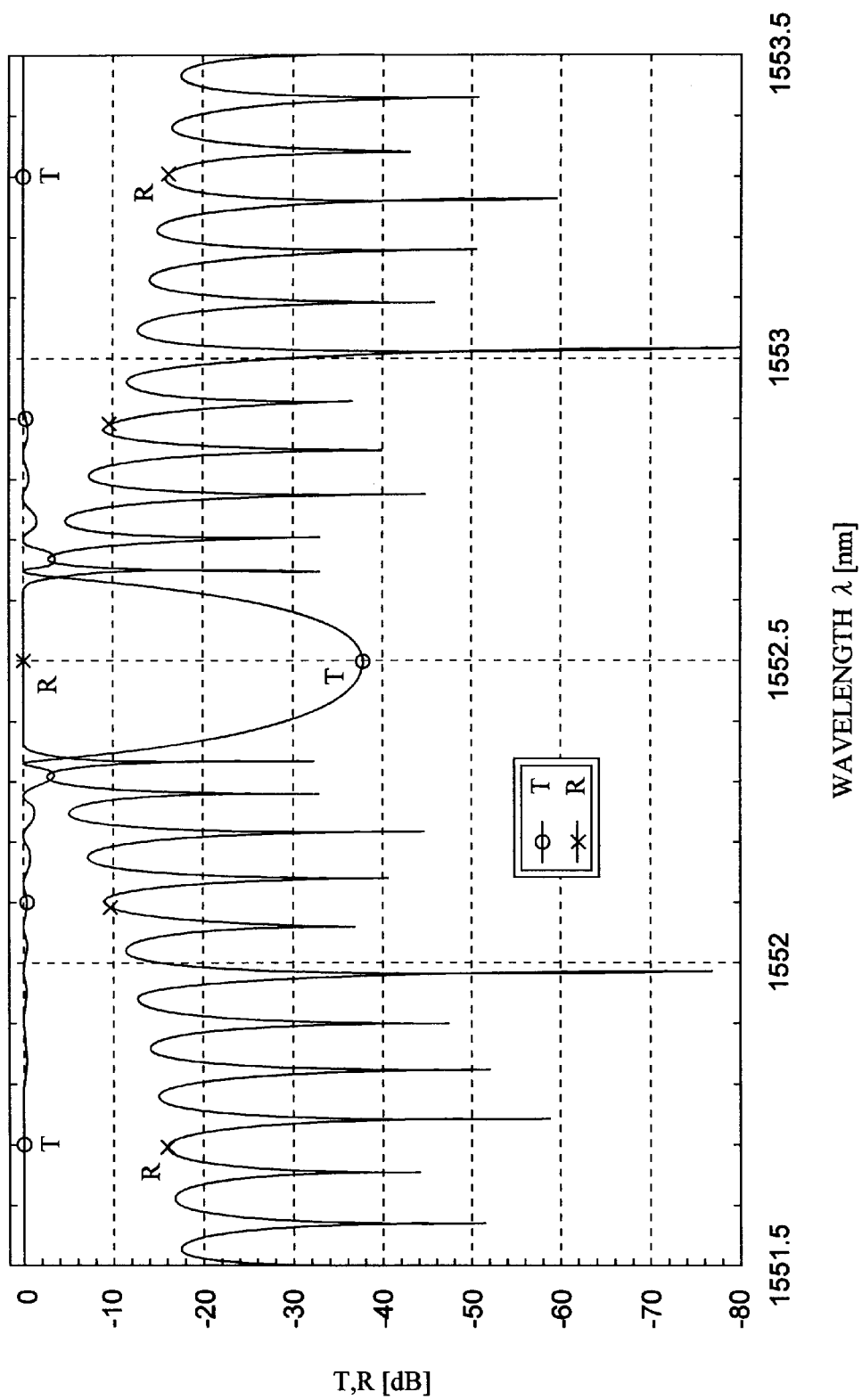
FIG. 8 is a graph showing transmission and reflection characteristics of an optical filter constituted by a grating whose amplitude of refractive index changing width is uniform.

When the transmission and reflection characteristics of the optical filters respectively shown in FIGS. 3 to 6 are compared with those of the optical filter in the case where the amplitude Δn of refractive index changing width is uniform (FIG. 8), in the transmission and reflection characteristics obtained in each of the cases (FIGS. 3 to 6) where a function type conforming to expression (4) is employed as the amplitude Δn of refractive index changing width, rising and falling of reflectivity R and transmittance T near cutoff wavelengths are more moderate but have practically sufficient acuteness. Also, the peak level of each ripple of reflectivity R outside the reflection wavelength band is low.

Figure 9:
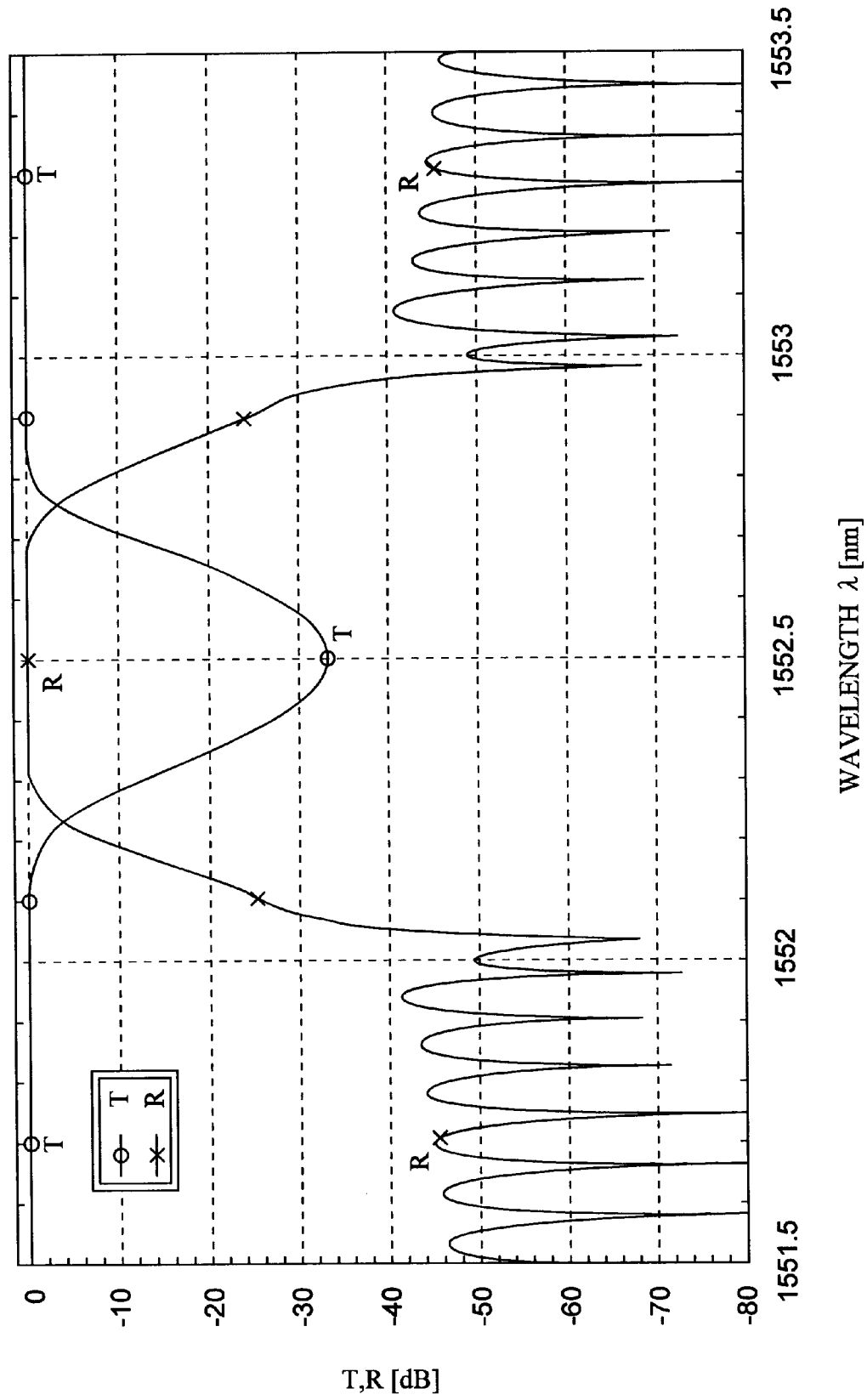
FIG. 9 is a graph showing transmission and reflection characteristics of an optical filter constituted by a grating whose amplitude of refractive index changing width is defined by a Gaussian function.

On the other hand, when the transmission and reflection characteristics of the optical filters respectively shown in FIGS. 3 to 6 are compared with those of the optical filter in the case where the amplitude Δn of refractive index changing width is of a Gaussian type (FIG. 9), in the transmission and reflection characteristics obtained in each of the cases (FIGS. 3 to 6) where a function type conforming to expression (4) is employed as the amplitude Δn of refractive index changing width, the rising and falling of reflectivity R and transmittance T near the cutoff wavelengths are more acute. Also, the peak level of each ripple of reflectivity R outside the reflection wavelength band is low.

Mutual comparisons among the transmission and reflection characteristics respectively shown in FIGS. 3 to 6 reveal that the rising and falling of reflectivity R and transmittance T near the cutoff wavelengths become more acute as the value of parameter x is greater. On the other hand, the greater the value of parameter x, the greater become ripples of reflectivity R near the reflection wavelength band. That is, though it is preferable to increase the value of parameter x from the viewpoint of acuteness in the rising and falling of reflectivity R and transmittance T near the cutoff wavelengths, it is not preferable from the viewpoint of suppressing the peak levels of ripples of reflectivity R outside the reflection wavelength band to low levels.

In view of the foregoing, the value of parameter x is preferably within the range of $1 < x \leq 2$. When the value of parameter x is within this range, reflectivity R and transmittance T rise up and fall down sufficiently acutely near the cutoff wavelengths, and the peak levels of ripples of reflectivity R in close proximity to the reflection wavelength band are not greater than about −24 dB, which is sufficiently low. Namely, an optical filter having characteristics suitably usable for WDM transmission can be realized. Depending on uses, there are cases where the peak levels of ripples of reflectivity R in close proximity to the reflection wavelength band may exceed the above-mentioned level of −24 dB. In these cases, the parameter x may have a value exceeding the above-mentioned range.

Though the foregoing explanation relates to the case where the refractive index changing width Δn changes in conformity to expression (4), it is clear that the refractive index changing width Δn may be changed not only in conformity to expression (4) but also in conformity to any function type which changes between upper and lower limits defined by values of two different functions, each based on expression (4), having different parameters x and different constants k. In this case, it is necessary for the function type to be such that, with respect to the standardized position z, Δn monotonously increases or decreases depending on whether the expression $-\pi \leq z \leq 0$ or $0 \leq z \leq \pi$ is satisfied, respectively.

In this case, it is necessary for Δn to change while satisfying:

$$k_1 \left[ 1 - \left( \frac{1 - \cos z}{2} \right)^{x_1} \right] \leq \Delta n \leq k_2 \left[ 1 - \left( \frac{1 - \cos z}{2} \right)^{x_2} \right]$$

Here, it is clear that $1 < x_1 \leq x_2$ and $k_1 \leq k_2$ hold true.

As explained in detail in the foregoing, the optical filter in accordance with the present invention functions as a bandpass filter for reflecting light within a reflection wavelength band which includes Bragg wavelength and transmitting light outside the reflection wavelength band, in which reflectivity and transmittance near its cutoff wavelengths rise up and fall down sufficiently acutely, and peak levels of ripples of reflectivity appearing outside the reflection wavelength band are sufficiently low, thereby yielding favorable transmission and reflection characteristics. Further, the case where the parameter x is set within a predetermined range is preferable in that peak levels of ripples of reflectivity appearing outside the reflection wavelength band become particularly low. Accordingly, the optical filter in accordance with the present invention can be suitably used for dividing signal light or the like in WDM transmission.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical filter formed with a grating whose refractive index fluctuates along an optical axis of an optical waveguide so as to reflect light in a predetermined wavelength band, wherein, assuming that a position in the grating area is defined by a positional coordinate value z which is standardized by $-\pi$ to $\pi$ in a light propagating direction, an amplitude $\Delta n$ of refractive index changing width in z satisfies:

$$k_1\left[1-\left(\frac{1-\cos z}{2}\right)^{x_1}\right] \le \Delta n \le k_2\left[1-\left(\frac{1-\cos z}{2}\right)^{x_2}\right]$$

$$k_1 \le k_2$$

$$1 < x_1 \le x_2 \le 2$$

by use of predetermined parameters $x_1$ and $x_2$ and proportional constants $k_1$ and $k_2$, said $\Delta n$ monotonously increasing or decreasing depending on whether the expression $-\pi \le z \le 0$ or $0 \le z \le \pi$ is satisfied, respectively.

2. An optical filter according to claim 1, wherein said proportional constants $k_1$ and $k_2$ satisfy:

$k_1 = k_2$.

* * * * *